US008845149B2

(12) United States Patent
Cheng et al.

(10) Patent No.: US 8,845,149 B2
(45) Date of Patent: Sep. 30, 2014

(54) PLANT ILLUMINATION APPARATUS AND PLANT ILLUMINATION SYSTEM

(71) Applicant: Chunghwa Picture Tubes, LTD., Taoyuan (TW)

(72) Inventors: Min-Chung Cheng, New Taipei (TW); Min-Lun Wu, Taoyuan County (TW); Che-Wei Chang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 74 days.

(21) Appl. No.: 13/831,881

(22) Filed: Mar. 15, 2013

(65) Prior Publication Data

US 2014/0204567 A1      Jul. 24, 2014

(30) Foreign Application Priority Data

Jan. 23, 2013   (TW) ............................... 10221497 U

(51) Int. Cl.
*F21V 5/00*     (2006.01)
*F21V 7/00*     (2006.01)
*F21V 33/00*    (2006.01)

(52) U.S. Cl.
CPC .................................. *F21V 33/0028* (2013.01)
USPC .............................................. 362/418; 362/1

(58) Field of Classification Search
CPC ........... A01G 7/045; A01G 9/24; A01G 9/12; F21Y 2101/02; Y02B 20/46; Y10S 47/06
USPC ........................................ 362/418, 231, 1, 19
See application file for complete search history.

(56) References Cited

U.S. PATENT DOCUMENTS

| | | | | |
|---|---|---|---|---|
| 5,095,414 A | * | 3/1992 | Tinus | 362/284 |
| 5,380,978 A | * | 1/1995 | Pryor | 219/121.64 |
| 2006/0032115 A1 | * | 2/2006 | Van Den Dool | 47/17 |

* cited by examiner

*Primary Examiner* — Tracie Y Green
(74) *Attorney, Agent, or Firm* — Jianq Chyun IP Office

(57) ABSTRACT

A plant illumination apparatus including a driving unit having a central axis, a first slide base, a second slide base, a light source, and a retractable arm having a retraction-control terminal and light-disposing terminal is provided. The first and second slide bases are disposed on the driving unit. The drive unit simultaneously drives the first and second slide bases to move along the central axis in opposite directions. The retraction-control terminal has a first end and a second end respectively connected to the first and second slide bases and moving therewith. When the first and second ends approach each other, the retractable arm extends so the light-disposing terminal moves away from the retraction-control terminal. When the first and second ends leave each other, the retractable arm retracts so the light-disposing terminal moves toward the retraction-control terminal. The light source is disposed on the light-disposing terminal to illuminate a plant.

10 Claims, 5 Drawing Sheets

PLANT ILLUMINATION APPARATUS AND PLANT ILLUMINATION SYSTEM

CROSS-REFERENCE TO RELATED APPLICATION

This application claims the priority benefit of Taiwan application serial no. 102201497, filed on Jan. 23, 2013. The entirety of the above-mentioned patent application is hereby incorporated by reference herein and made a part of this specification.

BACKGROUND OF THE INVENTION

1. Field of the Invention

The invention generally relates to a plant illumination apparatus and a plant illumination system, and more particularly, to a plant illumination apparatus and a plant illumination system using the same.

2. Description of Related Art

The traditional plant or vegetable cultivation procedure includes many tasks, such as plowing, sowing, fertilizing, pest control, harvesting, and periodic watering and weeding, to produce different ornamental plants or fresh vegetables. The environment and climate usually have a large impact on the cultivation of plants and vegetables. A hurricane or storm may cause severe damage on the crop of an entire season and accordingly cause the market price to rise. However, along with the development of technologies, plant or vegetable cultivation has been brought indoors to reduce the environmental and climatic impact.

Because most organic plants are grown indoors and the growth of these plants requires many hours of light per day, artificial illumination needs to be provided. However, all existing light source modules applied to indoor plant cultivation offer fixed illumination heights. Namely, different lamps have to be used for illuminating different plants, or the illumination height of a lamp has to be manually adjusted to illuminate different plants. Thus, the cost of indoor plant cultivation is very high, and the manual adjustment of illumination lamps makes it very inconvenient.

SUMMARY OF THE INVENTION

Accordingly, the invention is directed to a plant illumination apparatus capable of automatically adjusting the illumination height thereof on a plant.

The invention is directed to a plant illumination system capable of automatically and simultaneously adjusting the illumination heights thereof according to different plants.

The invention provides a plant illumination apparatus suitable for illuminating a plant. The plant illumination apparatus includes a driving unit, a first slide base, a second slide base, a retractable arm, and a light source. The driving unit has a central axis. The first slide base and the second slide base are respectively disposed on the driving unit. The driving unit is suitable for simultaneously driving the first slide base and the second slide base to move along the central axis in opposite directions. The retractable arm has a retraction-control terminal and a light-disposing terminal. The retraction-control terminal has a first end and a second end, and the first end and the second end are respectively connected to the first slide base and the second slide base to respectively move along with the first slide base and the second slide base. When the first end and the second end move toward each other, the retractable arm extends so that the light-disposing terminal moves away from the retraction-control terminal. When the first end and the second end move away from each other, the retractable arm retracts so that the light-disposing terminal moves towards the retraction-control terminal. The light source is disposed on the light-disposing terminal to illuminate the plant.

The invention provides a plant illumination system suitable for illuminating a plurality of plants. The plant illumination system includes a plurality of plant illumination apparatuses. Each of the plant illumination apparatuses includes a driving unit, a first slide base, a second slide base, a retractable arm, and a light source. The driving unit has a central axis. The first slide base and the second slide base are respectively disposed on the driving unit. The driving unit is suitable for simultaneously driving the first slide base and the second slide base to move along the central axis in opposite directions. The retractable arm has a retraction-control terminal and a light-disposing terminal. The retraction-control terminal has a first end and a second end, and the first end and the second end are respectively connected to the first slide base and the second slide base to respectively move along with the first slide base and the second slide base. When the first end and the second end move toward each other, the retractable arm extends so that the light-disposing terminal moves away from the retraction-control terminal. When the first end and the second end move away from each other, the retractable arm retracts so that the light-disposing terminal moves towards the retraction-control terminal. The light source is disposed on the light-disposing terminal to illuminate the corresponding plant. The driving units are connected with each other and are suitable for driving each other to move.

According to an embodiment of the invention, the driving unit further includes a servo motor, a pair of gears, and a conveyor belt. The gears are respectively located at two opposite ends of the central axis. The conveyor belt is looped around the outer surfaces of the gears. The servo motor is suitable for driving one of the gears to rotate, so as to drive the conveyor belt and accordingly the other gear to rotate. The first slide base and the second slide base are fixed on the conveyor belt and are respectively located at two opposite sides of the driving unit. When the servo motor rotates, the conveyor belt respectively drives the first slide base and the second slide base to move in opposite directions.

According to an embodiment of the invention, the plant illumination apparatus further includes a first slide rail and a second slide rail disposed in parallel. The driving unit is disposed between the first slide rail and the second slide rail. The first slide base includes a first driving portion and a first sliding portion. The second slide base includes a second driving portion and a second sliding portion. The first sliding portion and the second sliding portion are slidably disposed on the first slide rail and the second slide rail respectively. The first driving portion and the second driving portion are disposed on the driving unit and are respectively located at two opposite sides of the driving unit. The driving unit is suitable for simultaneously driving the first driving portion and the second driving portion to move in opposite directions, so as to drive the first sliding portion and the second sliding portion to respectively slide on the first slide rail and the second slide rail in opposite directions.

According to an embodiment of the invention, the retractable arm extends or retracts along a light path of the light source.

According to an embodiment of the invention, the plant is located on the light path.

According to an embodiment of the invention, the plant illumination system further includes a servo motor. The servo motor is connected to one of the driving units and drives the driving unit to rotate, so that the driving unit drives the other driving units to rotate and accordingly drives the first slide bases and the second slide bases respectively disposed on the driving units to respectively move along the corresponding central axes.

According to an embodiment of the invention, each of the driving units further includes a conveyor belt and a pair of gears. The gears are respectively located at two opposite ends of the central axis. The conveyor belt is looped around the outer surfaces of the gears. The gears of the driving units have different diameters, such that when the driving units driving each other to move, the conveyor belts looped around the outer surfaces of the gears have different moving speeds.

As described above, in a plant illumination apparatus provided by the invention, the height of a light source is adjusted by the rotation of a driving unit, so as to adjust the distance between the light source and a plant accordingly. Thus, by controlling the rotation speed of the driving unit according to the growth rate of the plant, the height of the light source can be automatically adjusted according to the height of the plant. In addition, in a plant illumination system provided by the invention, a plurality of plant illumination apparatuses are connected with each other therefore can drive each other to move, and the driving units in these plant illumination apparatuses have gears with different diameters, such that when the driving units drive each other to move, the driving units have different moving speeds, such that the light sources in the plant illumination apparatuses are moved to different heights. Accordingly, the diameter ratio among the gears of the driving units can be designed according to different growth rates of different plant to control the moving speeds of the driving units, so that the heights of different light sources in the plant illumination system can be automatically adjusted according to the heights of different plants. Thereby, in the invention, the plant illumination adjustment is more convenient and flexible, and the labor cost for manually adjusting the height of a light source is saved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
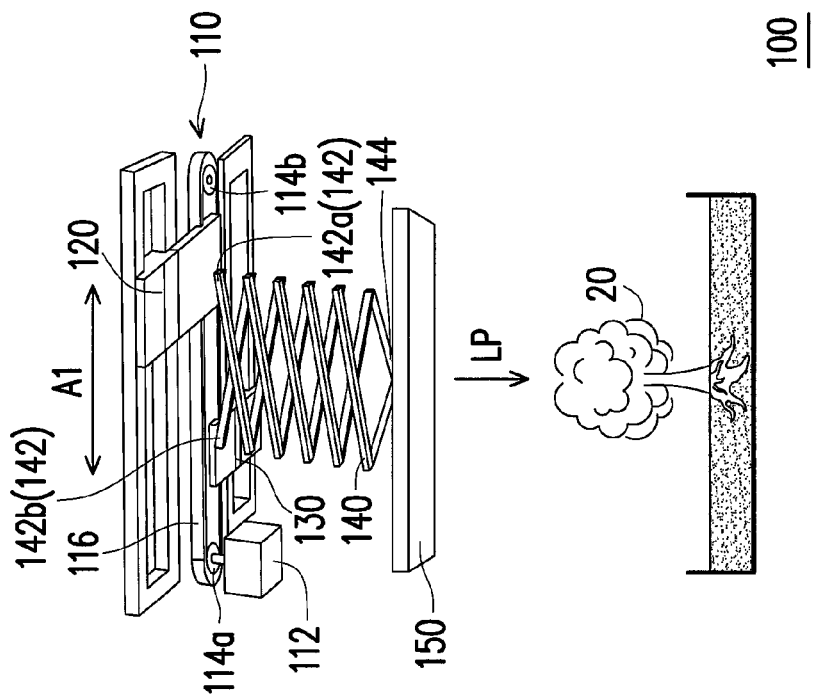
FIG. 1 is a diagram of a plant illumination apparatus according to an embodiment of the invention.

FIG. 1 is a diagram of a plant illumination apparatus according to an embodiment of the invention. Referring to FIG. 1, the plant illumination apparatus 100 in the present embodiment is suitable for illuminating a plant 20. The plant illumination apparatus 100 in the present embodiment includes a driving unit 110, a first slide base 120, a second slide base 130, a retractable arm 140, and a light source 150. The driving unit 110 has a central axis A1. The first slide base 120 and the second slide base 130 are respectively disposed on the driving unit 110. The driving unit 110 can simultaneously drive the first slide base 120 and the second slide base 130 to move along the central axis A1 in opposite directions. The retractable arm 140 has a retraction-control terminal 142 and a light-disposing terminal 144. The retraction-control terminal 142 has a first end 142a and a second end 142b. The first end 142a and the second end 142b are respectively connected to the first slide base 120 and the second slide base 130 to respectively move along with the first slide base 120 and the second slide base 130. The light source 150 is disposed on the light-disposing terminal 144, and the plant 20 is disposed on a light path LP of the light source 150, so that the light source 150 can illuminate the plant 20. The retractable arm 140 can extend and retract along the light path LP of the light source 150 to adjust the distance between the light source 150 and the plant 20.

To be specific, the driving unit 110 further includes a servo motor 112, a pair of gears 114a and 114b, and a conveyor belt 116. The gears 114a and 114b are located respectively at two opposite ends of the central axis A1. The conveyor belt 116 is looped around the outer surfaces of the gears 114a and 114b. The servo motor 112 can drive one of the gears 114a and 114b (for example, the gear 114a, as shown in FIG. 1) to rotate, so as to drive the conveyor belt 116, and accordingly the other gear (for example, the gear 114b, as shown in FIG. 1), to rotate. The first slide base 120 and the second slide base 130 are fixed on the conveyor belt 116 and are respectively located at two opposite sides of the driving unit 110. When the servo motor 112 rotates, the conveyor belt 116 drives the first slide base 120 and the second slide base 130 to respectively move in opposite directions.

Figure 2:
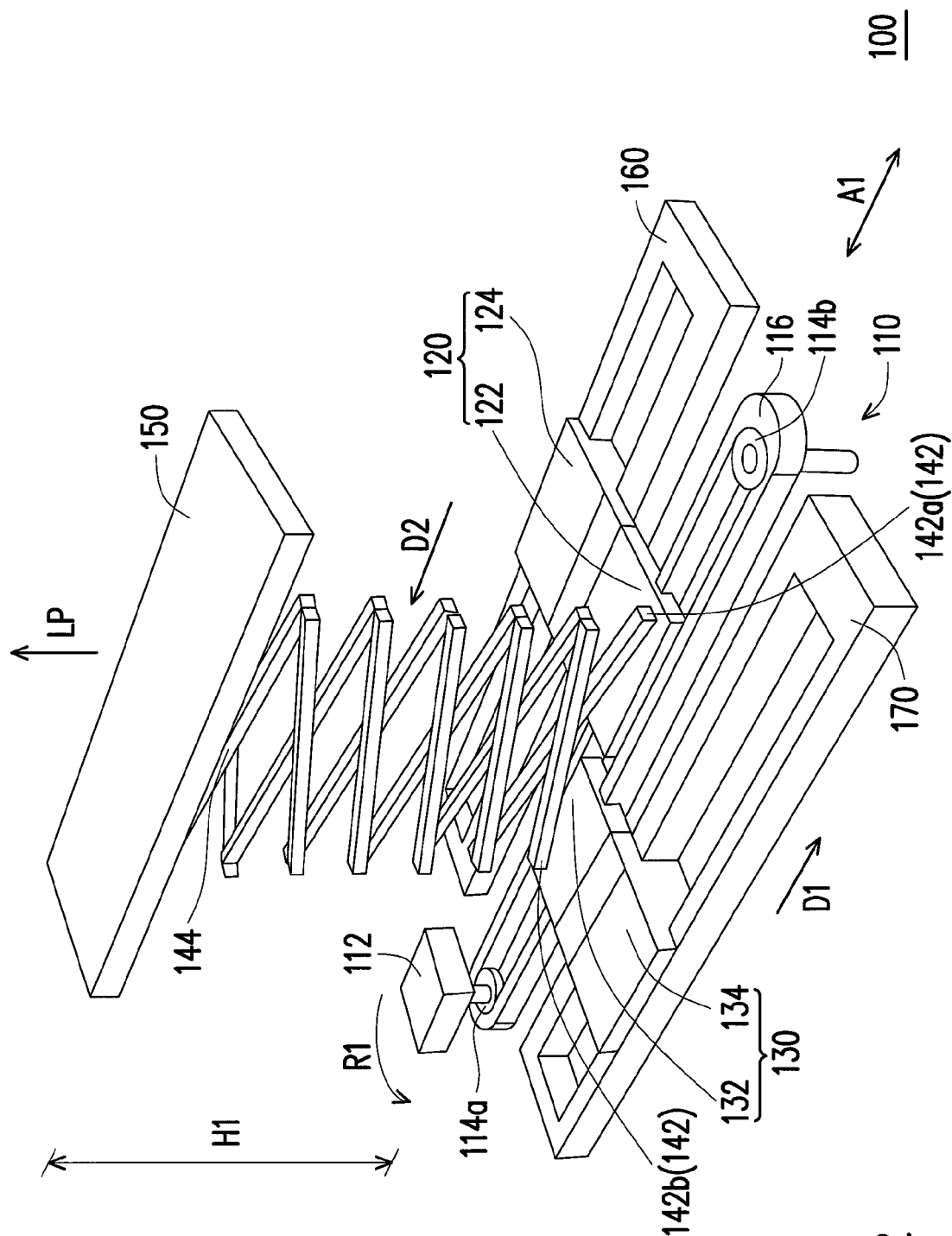
FIG. 2 is a bottom view of the plant illumination apparatus in FIG. 1 when a retractable arm of the plant illumination apparatus extends.
Figure 3:
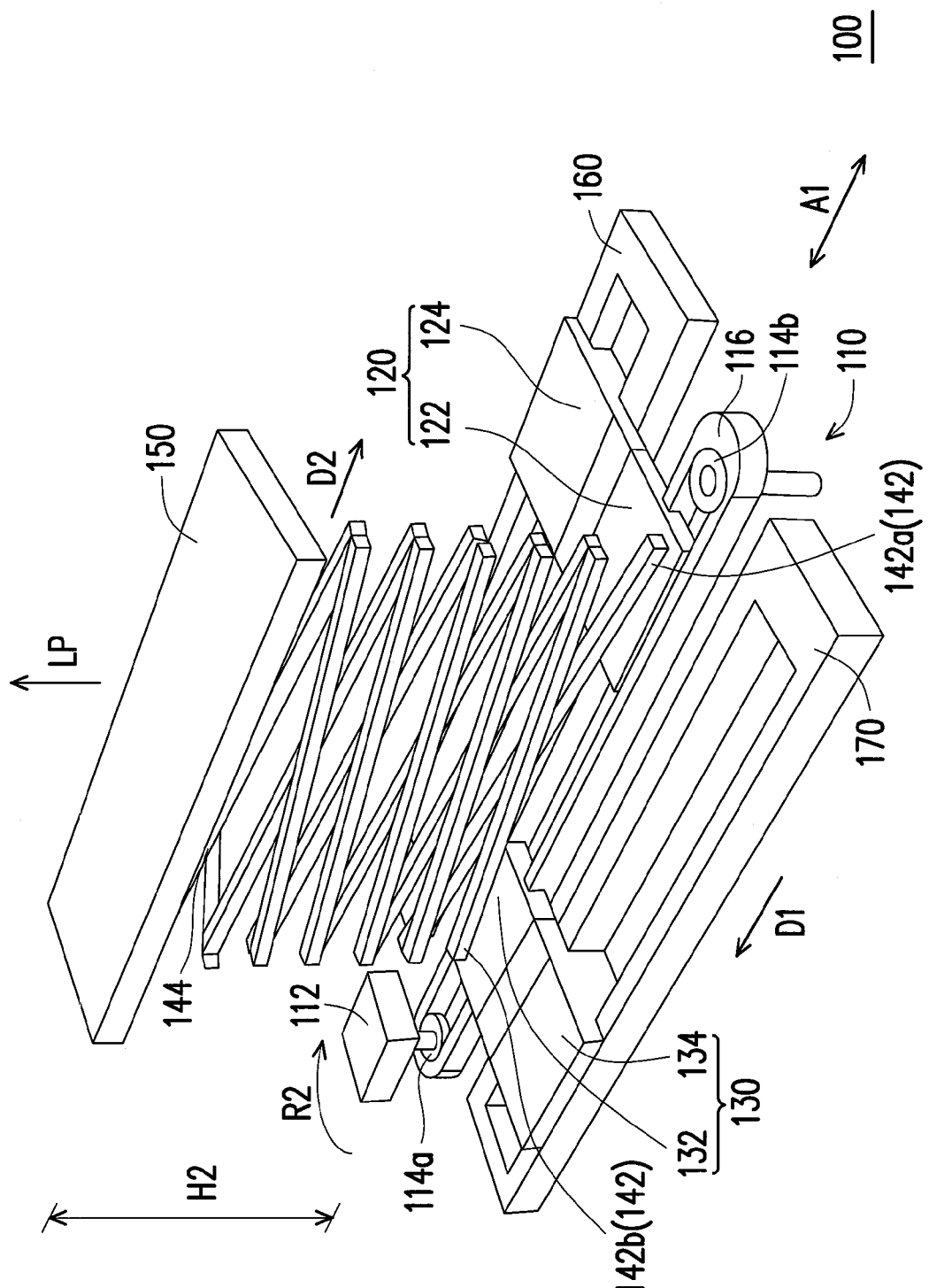
FIG. 3 is a bottom view of the plant illumination apparatus in FIG. 1 when the retractable arm of the plant illumination apparatus retracts.

FIG. 2 is a bottom view of the plant illumination apparatus in FIG. 1 when the retractable arm of the plant illumination apparatus extends. FIG. 3 is a bottom view of the plant illumination apparatus in FIG. 1 when the retractable arm of the plant illumination apparatus retracts. Referring to both FIG. 2 and FIG. 3, to be specific, the plant illumination apparatus 100 further includes a first slide rail 160 and a second slide rail 170 disposed in parallel. The driving unit 110 is disposed between the first slide rail 160 and the second slide rail 170. The first slide base 120 includes a first driving portion 122 and a first sliding portion 124. The second slide base 130 includes a second driving portion 132 and a second sliding portion 134. The first sliding portion 124 and the second sliding portion 134 are slidably disposed on the first slide rail 160 and the second slide rail 170 respectively. The first driving portion 122 and the second driving portion 132 are disposed on the conveyor belt 116 of the driving unit 110 and are respectively located at two opposite sides of the driving unit 110. When the servo motor 112 drives one of the gears 114a and 114b (for example, the gear 114a, as shown in FIG. 2) to rotate, the gear 114a drives the conveyor belt 116, and accordingly the other gear 114b, to rotate. Because the first driving portion 122 and the second driving portion 132 are respectively located at two opposite sides of the driving unit 110, when the conveyor belt 116 rotates, it drives the first driving portion 122 and the second driving portion 132 to move in opposite directions simultaneously, and accordingly drives the first sliding portion 124 and the second sliding portion 134 to respectively move on the first slide rail 160 and the second slide rail 170 in opposite directions.

For example, as shown in FIG. 2, when the servo motor 112 drives the gear 114a and the conveyor belt 116 to rotate along a first rotation direction R1 (for example, counterclockwise, as shown in FIG. 2), the first driving portion 122 is driven by the conveyor belt 116 to move in a first moving direction D1. Herein the second driving portion 132 located at the opposite side of the driving unit 110 is also driven by the conveyor belt 116 to move in a second moving direction D2. The first moving direction D1 and the second moving direction D2 are parallel to the central axis A1 but are reverse to each other, as shown in FIG. 2. Meanwhile, the first end 142a and the second end 142b respectively disposed at the first driving portion 122 and the second driving portion 132 move towards each other. Accordingly, the retractable arm 140 extends to a first height H1 along the light path LP, so that the light-disposing terminal 144 moves away from the retraction-control terminal 142. Thus, the distance between the plant and the light source 150 is shortened.

Similarly, as shown in FIG. 3, when the servo motor 112 drives the gear 114a and the conveyor belt 116 to rotate along a second rotation direction R2 (for example, clockwise, as shown in FIG. 2), the first driving portion 122 is driven by the conveyor belt 116 to move in the second moving direction D2. Herein the second driving portion 132 located at the opposite side of the driving unit 110 is also driven by the conveyor belt 116 to move in the first moving direction D1. At the time, the first end 142a and the second end 142b thus move away from each other. Accordingly, the retractable arm 140 retracts to a second height H2 smaller than the first height H1, so that the light-disposing terminal 144 moves towards the retraction-control terminal 142. Thereby, the distance between the plant and the light source 150 is prolonged.

In the present embodiment, the height of the light source 150, and the accordingly the distance between the light source 150 and the plant 20, is adjusted through the rotation of the driving unit 110. Thus, the rotation speed of the driving unit 110 can be controlled according to the growth of the plant 20 so that the height of the light source 150 can be automatically adjusted according to the height of the plant 20. Thereby, the operation of the plant illumination apparatus 100 is very convenient, and the labor cost for manually adjusting the height of the light source 150 is saved.

Figure 4:
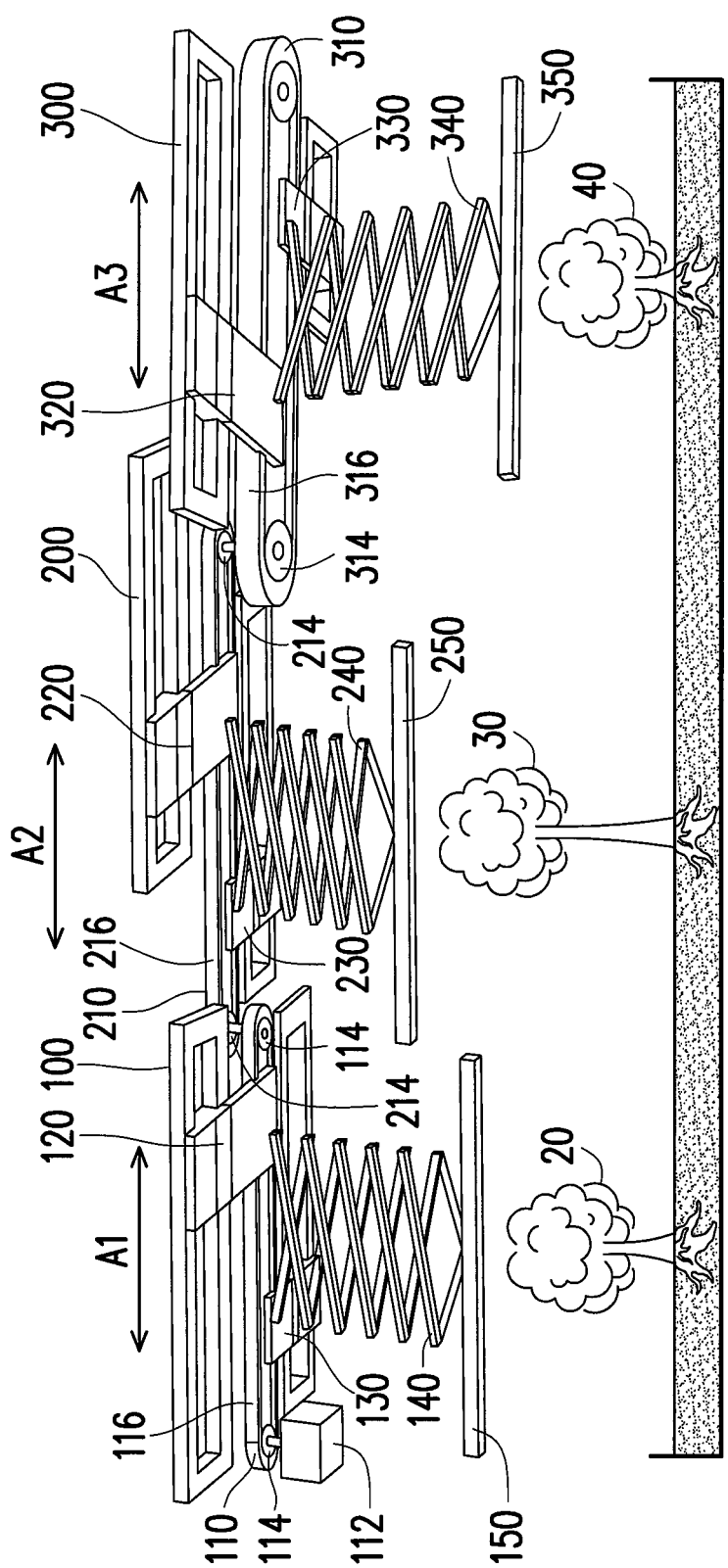
FIG. 4 is a diagram of a plant illumination system according to an embodiment of the invention.

FIG. 4 is a diagram of a plant illumination system according to an embodiment of the invention. Referring to FIG. 4, the plant illumination system 10 in the present embodiment is suitable for illuminating a plurality of plants 20, 30, and 40. The plant illumination system 10 includes a plurality of plant illumination apparatuses 100, 200, and 300. It should be noted that the plant illumination system 10 in the present embodiment is an application of the plant illumination apparatus 100 described in foregoing embodiments. Thus, the plant illumination apparatuses 100, 200, and 300 of the plant illumination system 10 in the present embodiment are similar to the plant illumination apparatus 100 in foregoing embodiment. Throughout the present embodiment and the embodiment described above, like reference numerals refer to the like elements, and the same technical contents are not described in the present embodiment and can be referred to the embodiment described above.

The plant illumination apparatuses 100, 200, and 300 in the present embodiment are similar to the plant illumination apparatus 100 in the embodiment described above. The difference is that the driving units 110, 210, and 310 in the present embodiment respectively include conveyor belts 116, 216, and 316 and gears 114, 214, and 314. Each pair of gears 114, 214, or 314 is respectively located at two opposite ends of the corresponding central axis A1, A2, or A3. The conveyor belts 116, 216, or 316 are respectively looped around the outer surfaces of the pair of gears 114, 214, or 314. The plant illumination system 10 in the present embodiment further includes a servo motor 112. The servo motor 112 is connected to one of the gears 114, 214, and 314 (for example, the gear 114, as shown in FIG. 4) of the driving units 110, 210, and 310 to drive the gear, and accordingly the driving unit (the driving unit 110, as shown in FIG. 4) having the gear, to rotate. In the present embodiment, the driving units 110, 210, and 310 are connected with each other therefore can drive each other to move. For example, when the driving unit 110 rotates, it drives the driving units 210 and 310 to rotate as well, so that the first slide bases 120, 220, and 320 and the second slide bases 130, 230, and 330 disposed on the driving units 110, 210, and 310 can move in opposite directions along the central axes A1, A2, and A3.

Figure 5:
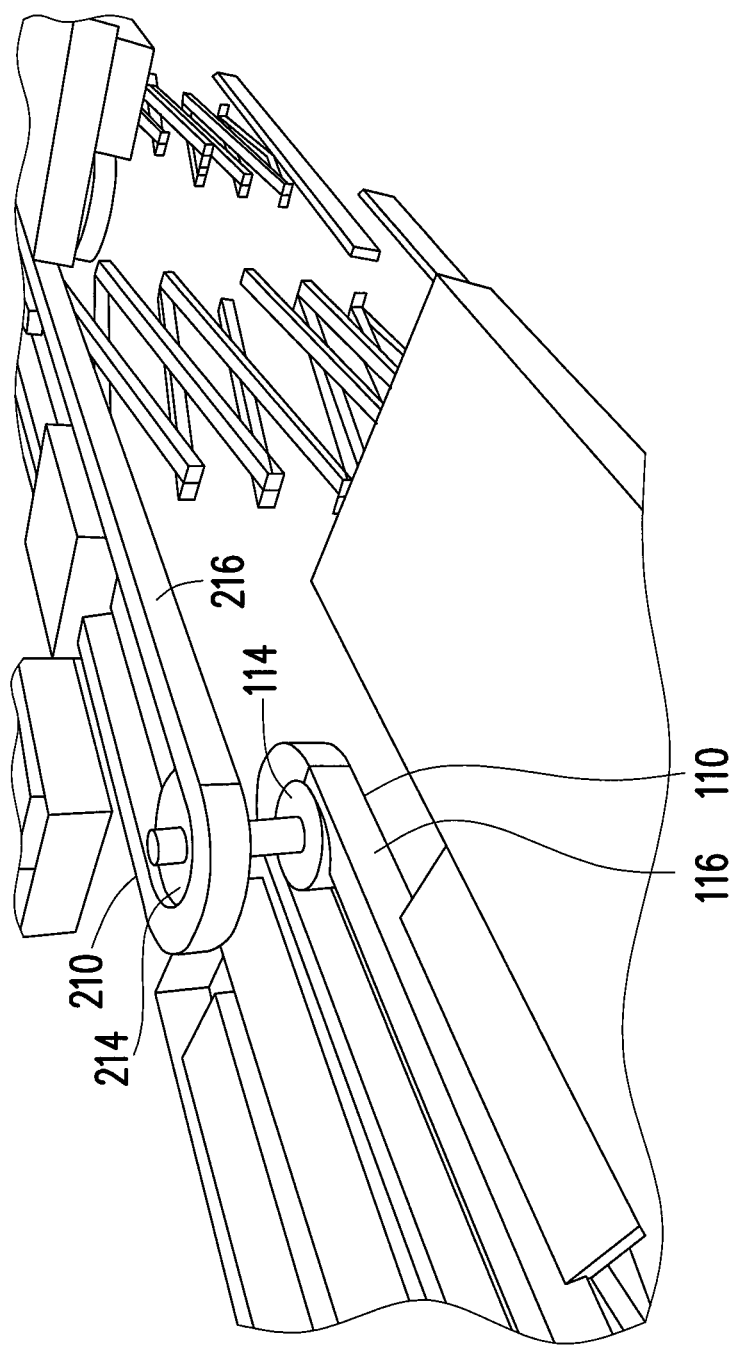
FIG. 5 is a diagram illustrating the connections between driving units in a plant illumination system according to an embodiment of the invention.

FIG. 5 is a diagram illustrating the connections between driving units in a plant illumination system according to an embodiment of the invention. Referring to FIG. 5, the gears 114, 214, and 314 have different diameters, and as shown in FIG. 5, the driving units 110, 210, and 310 are connected with each other through the axle centers of the gears 114, 214, and 314. Namely, the driving units 110 and 210 are connected with each other through the axle centers of the corresponding gears 114 and 214, and the driving units 210 and 310 are connected with each other through the axle centers of the corresponding gears 214 and 314. Thus, when the servo motor 112 drives one of the gears 114, 214, and 314 (for example, the gear 114, as shown in FIG. 5) to rotate, the other gears (for example, the gears 214 and 314) are driven to rotate as well. Herein because the gears 114, 214, and 314 have different diameters, the conveyor belts 116, 216, and 316 respectively looped around the outer surfaces of the gears 114, 214, and 314 have different moving speeds. The first slide bases 120, 220, and 320 and the second slide bases 130, 230, and 330 respectively driven by the conveyor belts 116, 216, and 316 also have different moving speeds. Accordingly, the retractable arms 140, 240, and 340 of the plant illumination apparatuses 100, 200, and 300 have different extension or retraction speeds.

In the present embodiment, the plant illumination system 10 has a plurality of plant illumination apparatuses 100, 200, and 300, and the gears 114, 214, and 314 of the driving units 110, 210, and 310 in the plant illumination apparatuses 100, 200, and 300 have different diameters, such that when the driving units 110, 210, and 310 drive each other to move, the moving speeds thereof are different, and accordingly the height of the light sources 150, 250, and 350 of the plant illumination apparatuses 100, 200, and 300 are different from each other. Thereby, the ratio among the diameters of the gears 114, 214, and 314 of the driving units 110, 210, and 310 can be designed according to different growth rates of the plants 20, 30, and 40, so as to control the moving speeds of the driving units 110, 210, and 310, such that the heights of the light sources 150, 250, and 350 in the plant illumination system 10 can be automatically adjusted according to the heights of the plants 20, 30, and 40. Thus, the operation of the plant illumination system 10 is very convenient and flexible, and the labor cost for manually adjusting the heights of the light sources 150, 250, and 350 is saved.

As described above, in a plant illumination apparatus provided by the invention, the height of a light source, and accordingly the distance between the light source and a plant, is adjusted through the rotation of a driving unit. Thus, by controlling the rotation speed of the driving unit according to the growth rate of the plant, the height of the light source can be automatically adjusted according to the height of the plant. In addition, in a plant illumination system provided by the invention, a plurality of plant illumination apparatuses are connected with each other therefore can drive each other to move, and the driving units in these plant illumination apparatuses have gears with different diameters, such that when the driving units drive each other to move, the driving units have different moving speeds, and accordingly the light sources in the plant illumination apparatuses are moved to different heights. Accordingly, the diameter ratio among the gears of the driving units can be designed according to different growth rates of different plant to control the moving speeds of the driving units, so that the heights of different light sources in the plant illumination system can be automatically adjusted according to the heights of different plants. Thereby, in the invention, the plant illumination adjustment is very convenient and flexible, and the labor cost for manually adjusting the height of a light source is saved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A plant illumination apparatus, suitable for illuminating a plant, the plant illumination apparatus comprising:
   a driving unit, having a central axis;
   a first slide base and a second slide base, respectively disposed on the driving unit, wherein the driving unit is suitable for simultaneously driving the first slide base and the second slide base to move along the central axis in opposite directions;
   a retractable arm, having a retraction-control terminal and a light-disposing terminal, wherein the retraction-control terminal has a first end and a second end, the first end and the second end are respectively connected to the first slide base and the second slide base to respectively move along with the first slide base and the second slide base, when the first end and the second end move toward each other, the retractable arm extends so that the light-disposing terminal moves away from the retraction-control terminal, and when the first end and the second end move away from each other, the retractable arm retracts so that the light-disposing terminal moves towards the retraction-control terminal; and
   a light source, disposed on the light-disposing terminal, and illuminating the plant.

2. The plant illumination apparatus according to claim 1, wherein the driving unit further comprises a servo motor, a pair of gears, and a conveyor belt, the gears are respectively located at two opposite ends of the central axis, the conveyor belt is looped around outer surfaces of the gears, the servo motor is suitable for driving one of the gears to rotate, so as to drive the conveyor belt and accordingly the other gear to rotate, the first slide base and the second slide base are fixed on the conveyor belt and are respectively located at two opposite sides of the driving unit, and when the servo motor rotates, the conveyor belt respectively drives the first slide base and the second slide base to move in opposite directions.

3. The plant illumination apparatus according to claim 1 further comprising a first slide rail and a second slide rail disposed in parallel, wherein the driving unit is disposed between the first slide rail and the second slide rail, the first slide base comprises a first driving portion and a first sliding portion, the second slide base comprises a second driving portion and a second sliding portion, the first sliding portion and the second sliding portion are slidably disposed on the first slide rail and the second slide rail respectively, the first driving portion and the second driving portion are disposed on the driving unit and are respectively located at two opposite sides of the driving unit, and the driving unit is suitable for simultaneously driving the first driving portion and the second driving portion to move in opposite directions, so as to drive the first sliding portion and the second sliding portion to respectively slide on the first slide rail and the second slide rail in opposite directions.

4. The plant illumination apparatus according to claim 1, wherein the retractable arm extends or retracts along a light path of the light source.

5. The plant illumination apparatus according to claim 4, wherein the plant is located on the light path.

6. A plant illumination system, suitable for illuminating a plurality of plants, the plant illumination system comprising:
   a plurality of plant illumination apparatuses, wherein each of the plant illumination apparatuses comprises:
      a driving unit, having a central axis;
      a first slide base and a second slide base, respectively disposed on the driving unit, wherein the driving unit is suitable for simultaneously driving the first slide base and the second slide base to move along the central axis in opposite directions;
      a retractable arm, having a retraction-control terminal and a light-disposing terminal, wherein the retraction-control terminal has a first end and a second end, the first end and the second end are respectively connected to the first slide base and the second slide base to respectively move along with the first slide base and the second slide base, when the first end and the second end move toward each other, the retractable arm extends so that the light-disposing terminal moves away from the retraction-control terminal, and when the first end and the second end move away from each other, the retractable arm retracts so that the light-disposing terminal moves towards the retraction-control terminal; and
      a light source, disposed on the light-disposing terminal, and illuminating the corresponding plant;
   wherein the driving units are connected with each other and are suitable for driving each other to move.

7. The plant illumination system according to claim 6 further comprising a servo motor, wherein the servo motor is connected to one of the driving units and drives the connected driving unit to rotate, so that the connected driving unit drives the other driving units to rotate and accordingly drives the first slide bases and the second slide bases respectively disposed on the driving units to respectively move along the corresponding central axes.

8. The plant illumination system according to claim 7, wherein each of the driving units further comprises:
   a conveyor belt; and
   a pair of gears, wherein the gears are respectively located at two opposite ends of the central axis, and the conveyor belt is looped around outer surfaces of the gears,
   wherein the gears have different diameters such that when the driving units driving each other to move, the conveyor belts looped around the outer surfaces of the gears have different moving speeds.

9. The plant illumination system according to claim 6, wherein each of the plant illumination apparatuses further comprises a first slide rail and a second slide rail disposed in parallel, the driving unit is disposed between the first slide rail and the second slide rail, the first slide base comprises a first driving portion and a first sliding portion, the second slide base comprises a second driving portion and a second sliding portion, the first sliding portion and the second sliding portion are slidably disposed on the first slide rail and the second slide rail respectively, the first driving portion and the second driving portion are disposed on the driving unit and are respectively located at two opposite sides of the driving unit, and the driving unit is suitable for simultaneously driving the first driving portion and the second driving portion to move in opposite directions, so as to drive the first sliding portion and the second sliding portion to respectively slide on the first slide rail and the second slide rail in opposite directions.

10. The plant illumination system according to claim 6, wherein each of the retractable arms extends or retracts along a light path of the corresponding light source, and the plants are respectively disposed on the light paths.

\* \* \* \* \*